(12) United States Patent
Funabashi

(10) Patent No.: US 10,546,498 B2
(45) Date of Patent: Jan. 28, 2020

(54) ENCOUNTER VEHICLE DETERMINATION APPARATUS

(71) Applicant: DENSO CORPORATION, Kariya, Aichi-pref. (JP)

(72) Inventor: Junichiro Funabashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 238 days.

(21) Appl. No.: 15/549,439

(22) PCT Filed: Feb. 12, 2016

(86) PCT No.: PCT/JP2016/000717
§ 371 (c)(1),
(2) Date: Aug. 8, 2017

(87) PCT Pub. No.: WO2016/139896
PCT Pub. Date: Sep. 9, 2016

(65) Prior Publication Data
US 2018/0025642 A1  Jan. 25, 2018

(30) Foreign Application Priority Data
Mar. 2, 2015  (JP) ................... 2015-040407

(51) Int. Cl.
*G08G 1/16* (2006.01)
*H04W 84/18* (2009.01)
(Continued)

(52) U.S. Cl.
CPC ............. *G08G 1/163* (2013.01); *G01C 21/26* (2013.01); *G01C 21/3697* (2013.01);
(Continued)

(58) Field of Classification Search
CPC .. G01C 21/26; G01C 21/3697; G08G 1/0125; G08G 1/09626; G08G 1/163; G08G 1/166; H04W 84/005; H04W 84/18
See application file for complete search history.

(56) References Cited

U.S. PATENT DOCUMENTS

2007/0282532 A1    12/2007  Yamamoto et al.
2012/0010762 A1*    1/2012  Asano ................... G08G 1/166
                                                                   701/1

FOREIGN PATENT DOCUMENTS

JP        2010224762 A      10/2010
JP        2010286877 A      12/2010
(Continued)

OTHER PUBLICATIONS

Translation of JP-5082349-B2 obtained via ESPACENET on May 28, 2019. (Year: 2012).*

*Primary Examiner* — Jeffrey C Boomer
(74) *Attorney, Agent, or Firm* — Harness, Dickey & Pierce, P.L.C.

(57) ABSTRACT

In an encounter vehicle determination apparatus, a probability of a host vehicle entering a host-vehicle intersection on a host-vehicle's course on a map-is estimated. A different-vehicle intersection on a course of a different vehicle on a map either (i) along the host-vehicle's course or (ii) from a connection road with the host-vehicle intersection to the host-vehicle's course is extracted within a predetermined range based on vehicle information acquired from the different vehicle via inter-vehicle communications. A probability of the different vehicle entering the different-vehicle intersection is estimated. A probability of encounter between the host vehicle and the different vehicle at the host-vehicle intersection is calculated from the estimated probabilities of (i) the host vehicle entering the host-vehicle intersection and (ii) the different vehicle entering the different-vehicle inter- (Continued)

section. The different vehicle having the probability of encounter equal to or more than a threshold is determined to encounter the host vehicle.

8 Claims, 8 Drawing Sheets

(51) Int. Cl.
    *H04W 84/00*     (2009.01)
    *G08G 1/0962*     (2006.01)
    *G01C 21/36*     (2006.01)
    *G01C 21/26*     (2006.01)
    *G08G 1/01*     (2006.01)

(52) U.S. Cl.
    CPC ....... *G08G 1/0125* (2013.01); *G08G 1/09626* (2013.01); *G08G 1/166* (2013.01); *H04W 84/005* (2013.01); *H04W 84/18* (2013.01)

(56) References Cited

FOREIGN PATENT DOCUMENTS

| | | | |
|---|---|---|---|
| JP | 2012123729 | A | 6/2012 |
| JP | 5082349 | B2 * | 11/2012 |
| JP | 2013205177 | A | 10/2013 |

\* cited by examiner

ENCOUNTER VEHICLE DETERMINATION APPARATUS

CROSS REFERENCE TO RELATED APPLICATIONS

This application is a U.S. National Phase Application under 35 U.S.C. 371 of International Application No. PCT/JP2016/000717 filed on Feb. 12, 2016 and published in Japanese as WO 2016/139896 A1 on Sep. 9, 2016. This application is based on and claims the benefit of priority from Japanese Patent Application No. 2015-040407 filed on Mar. 2, 2015. The entire disclosures of all of the above applications are incorporated herein by reference.

TECHNICAL FIELD

A present disclosure relates to an encounter vehicle determination apparatus that determines a different vehicle that encounters, with a predetermined probability or more, a host vehicle that mounts the apparatus.

BACKGROUND OF INVENTION

Patent Literature 1 discloses a technique of determining a different vehicle that encounters a host vehicle by using information acquired from the different vehicle via inter-vehicle communication. The technique of Patent Literature 1 matches, on a map, a position of the host vehicle acquired from a car navigation apparatus and a position of the different vehicle acquired from the different vehicle via the inter-vehicle communication. Then, the nearest intersection ahead of the host vehicle is extracted from a map database (hereinafter, DB) based on the position of the host vehicle on the map, and a series of intersections on a travel road where the different vehicle continues traveling straight is extracted from the map DB based on the position of the different vehicle on the map. When the series of intersections on the travel road of the different vehicle includes the nearest intersection ahead of the host vehicle and when the different vehicle enters the nearest intersection ahead of the host vehicle in a different direction from the host vehicle, the different vehicle is determined to encounter the host vehicle.

PRIOR ART LITERATURES

Patent Literature

Patent Literature 1: JP 2008-065480 A (JP 5082349 B2)

SUMMARY OF THE INVENTION

However, when a different vehicle that turns left or right at a previous intersection instead of traveling straight is not considered as in the technique of Patent Literature 1, even a different vehicle having a low probability of reaching the nearest intersection ahead of the host vehicle may be determined to encounter the host vehicle.

An object of the present disclosure is to provide an encounter vehicle determination apparatus that accurately determines a different vehicle having a higher possibility of encountering a host vehicle.

According to an example of the present disclosure, an encounter vehicle determination apparatus used in a vehicle is provided as follows. That is, the encounter vehicle determination apparatus includes: a different-vehicle information acquisition section that acquires different-vehicle information transmitted by wireless communication from a different vehicle around a host vehicle mounting the encounter vehicle determination apparatus to specify a position and a travel direction of the different vehicle; a different-vehicle state specification section that specifies the position and the travel direction of the different vehicle based on the different-vehicle information acquired by the different-vehicle information acquisition section; a host-vehicle course estimation section that estimates a host-vehicle course on a map; a host-vehicle intersection extraction section that extracts host-vehicle intersections that are intersections on the host-vehicle course estimated by the host-vehicle course estimation section; a connection road extraction section that extracts roads in a predetermined range, the roads connecting to the host-vehicle intersections extracted by the host-vehicle intersection extraction section; a different-vehicle map matching section that performs map matching to match the different vehicle to a road of the map based on the position and the travel direction of the different vehicle specified by the different-vehicle state specification section; a different-vehicle intersection extraction section that extracts different-vehicle intersections that are intersections on a course where the different vehicle matched either to the host-vehicle course estimated by the host-vehicle course estimation section or to the road extracted by the connection road extraction section travels from a matched location of the different vehicle to the host-vehicle course; a host-vehicle intersection entering probability estimation section that estimates probabilities of the host vehicle entering the host-vehicle intersections extracted by the host-vehicle intersection extraction section; a different-vehicle intersection entering probability estimation section that estimates probabilities of the different vehicle entering the different-vehicle intersections extracted by the different-vehicle intersection extraction section; an encounter probability calculation section that calculates a probability of an encounter between the host vehicle and the different vehicle at each host-vehicle intersection from probabilities of the host vehicle entering the host-vehicle intersections estimated by the host-vehicle intersection entering probability estimation section and probabilities of the different vehicle entering the different-vehicle intersections estimated by the different-vehicle intersection entering probability estimation section; and an encounter determination section that determines, as the different vehicle that encounters the host vehicle, the different vehicle having the probability of the encounter calculated to be equal to or more than a threshold, by the encounter probability calculation section.

This apparatus can specify a position of a different vehicle on a road. This is because a different-vehicle information acquisition section acquires different-vehicle information to specify the position and travel direction of the different vehicle wirelessly transmitted from the different vehicle around a host vehicle mounting the apparatus, and a different-vehicle map matching section matches the different vehicle to the road on a map based on the position and travel direction of the different vehicle specified by a different-vehicle state specification section based on the different-vehicle information. Since the position of the different vehicle on the road can be specified, different-vehicle intersections can be extracted on the course on which the different vehicle travels from the specified position toward the host-vehicle course on the map estimated by the host-vehicle course estimation section. Since the different-vehicle intersections are on the course toward the host-vehicle course, a different-vehicle intersection extraction section can also extract the same different-vehicle intersection as a host-vehicle intersection on the host-vehicle course.

Since the same different-vehicle intersection as the host-vehicle intersection can be also extracted, an encounter probability calculation section can calculate a probability of an encounter between the host vehicle and different vehicle at the host-vehicle intersection. This calculation is made using a probability of the host vehicle entering each host-vehicle intersection estimated by a host-vehicle intersection entering probability estimation section and a probability of the different vehicle entering the same different-vehicle intersection as the host-vehicle intersection estimated by a different-vehicle intersection entering probability estimation section. Since the different vehicle having an encounter probability calculated as equal to or more than a threshold by the encounter probability calculation section is determined by an encounter determination section as the different vehicle that encounters the host vehicle, the different vehicle that encounters the host vehicle at the host-vehicle intersection with a probability equal to or more than a threshold can be accurately determined.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION (First Embodiment)
<Schematic Configuration of Driving Assist System 100>

Figure 1:
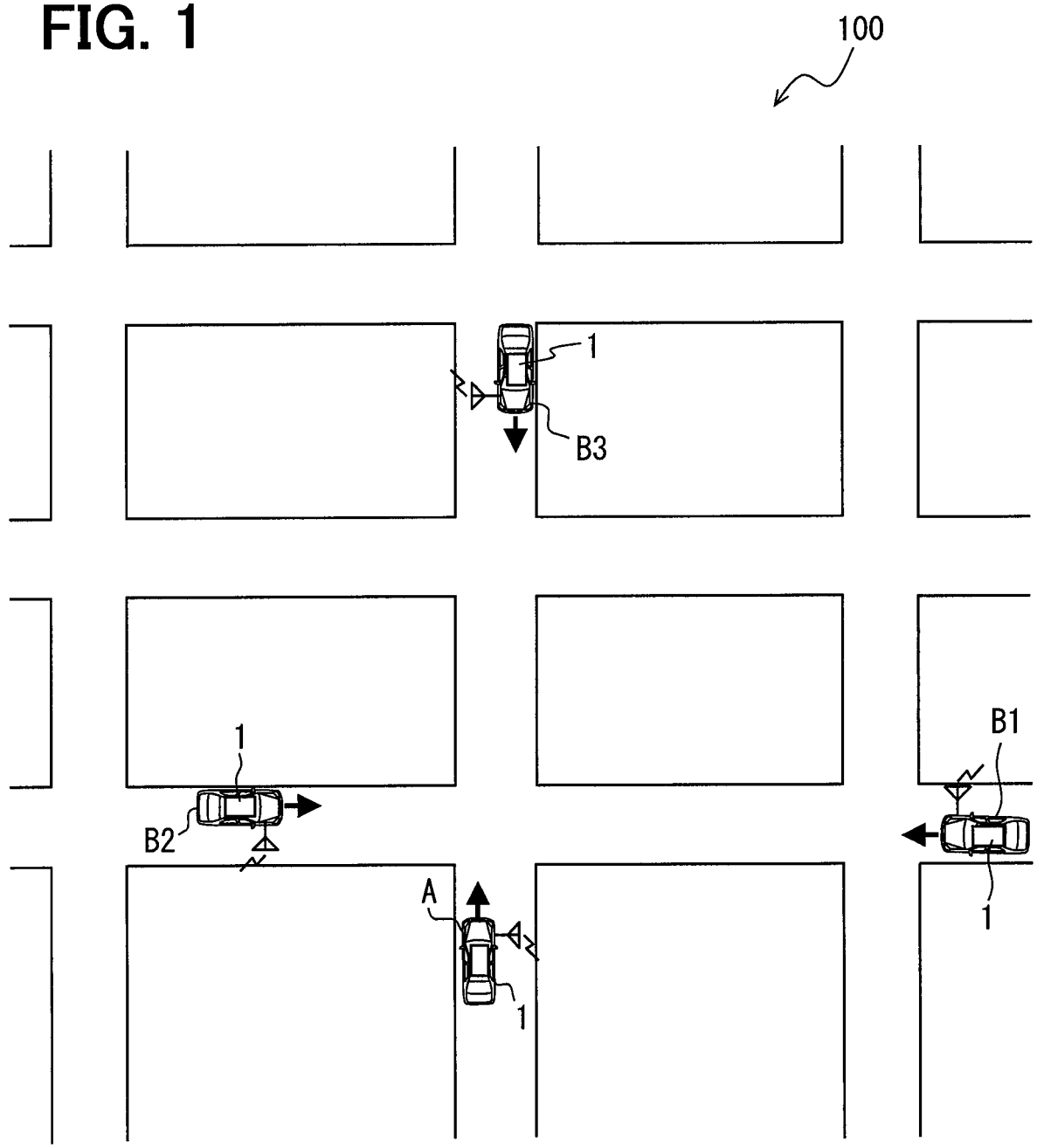
FIG. 1 is a diagram illustrating an example of a schematic configuration of a driving assist system.

Hereafter, an embodiment of the present disclosure is described using the drawings. FIG. 1 illustrates an example of a schematic configuration of a driving assist system 100 applied with the present disclosure. The driving assist system 100 in FIG. 1 includes a driving assist unit 1 in each of a plurality of vehicles (see A and B1 to B3 in FIG. 1). The arrows in FIG. 1 indicate travel directions of the vehicles A and B.

The vehicle A is also called a subject vehicle or a first vehicle. The vehicles B1 to B3 are also called: different vehicles that are located around the vehicle A and different from the subject vehicle; surrounding vehicles; or second vehicles. The vehicle A and vehicles B1 to B3 each mounting the driving assist unit 1 correspond to host vehicles for the driving assist unit 1.

Note that the present embodiment primarily explains the vehicle A, which is the subject vehicle. In this case, the different vehicles correspond to the vehicles B1 to B3, and the host vehicle may correspond to only the vehicle A.

The present embodiment indicates that the driving assist unit 1 of the vehicle A includes the same components as each driving assist unit 1 of the vehicles B1 to B3 as an example, but does not need to always include the fully same components. The driving assist system 100 may include at least a component required for each driving assist unit 1. Each driving assist unit 1 of the vehicles B1 to B3 may not include some components of the driving assist unit 1 of the vehicle A. The driving assist unit 1 of the vehicle A may not include some components of each driving assist unit 1 of the vehicles B1 to B3.

The present embodiment explains the three vehicles B1 to B3. The following explanation may be possible when at least one different vehicle is present. The driving assist system 100 may include at least one vehicle B or two, three, and more vehicles B.

<Schematic Configuration of Driving Assist Unit 1>

Figure 2:
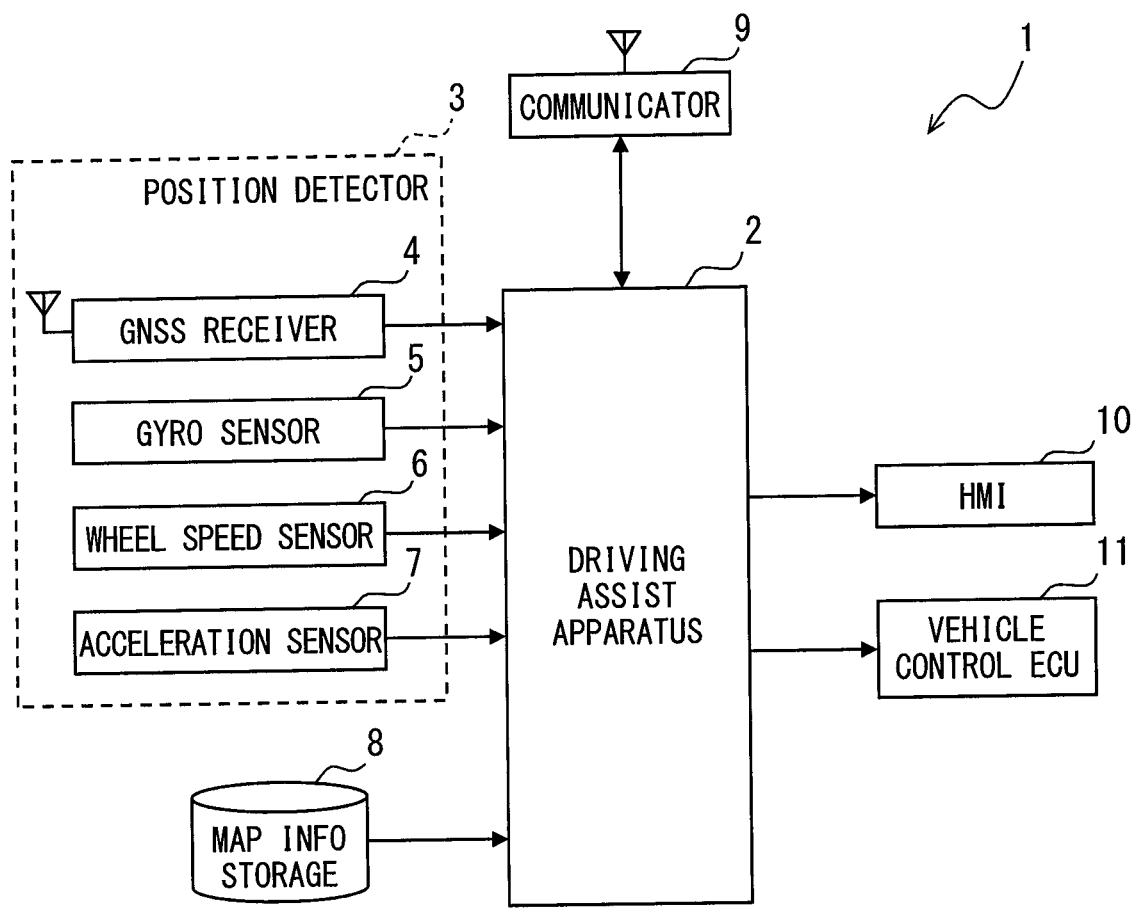
FIG. 2 is a block diagram illustrating an example of a schematic configuration of a driving assist unit.

A schematic configuration of the driving assist unit 1 mounted to the vehicles A and B1 to B3 is explained using FIG. 2. As in FIG. 2, the driving assist unit 1 includes a driving assist apparatus 2, a position detector 3, a map information storage 8, a communicator 9, an HMI (Human Machine Interface) 10, and a vehicle control ECU 11. The driving assist apparatus 2 is also called an encounter vehicle determination apparatus.

The position detector 3 includes a GNSS receiver 4, a gyroscopic sensor 5, a wheel speed sensor 6, and an acceleration sensor 7, and sequentially detects a current vehicle position of a host vehicle. The GNSS receiver 4 is used for a GNSS (Global Navigation Satellite System), and receives signals transmitted from a positioning satellite through a GNSS antenna. The position detector 3 determines vehicle positions based on the signals received by the GNSS receiver 4.

The gyroscopic sensor 5 detects an angular velocity of the host vehicle. The gyroscopic sensor 5 is a three-axis gyroscopic sensor that detects change rates of a yaw angle, a roll angle, and a pitch angle. The wheel speed sensor 6 sequentially outputs a pulse signal in response to rotational speeds of wheels of the host vehicle. Vehicle speeds and traveled distances of the host vehicle can be detected from the pulse signal outputted from the wheel speed sensor 6. The acceleration sensor 7 detects an acceleration that longitudinally acts on the host vehicle. The acceleration sensor 7 is a three-axis acceleration sensor as an example. A vehicle speed of the host vehicle can be obtained by integrating an acceleration detected by the acceleration sensor 7.

The position detector 3 performs dead reckoning to compensate for positioning results of the GNSS receiver 4 through the dead-reckoning navigation that estimates a vehicle position from the pulse signal outputted from the wheel speed sensor 6 and a change rate (yaw rate) of a yaw angle detected by the gyroscopic sensor 5. The acceleration sensor 7 may be used for the dead-reckoning navigation instead of the wheel speed sensor 6.

The map information storage 8 stores map information. The map information contains node data and link data. The link connects between the nodes when each road on an electronic map is partitioned at a plurality of nodes such as intersections where roads cross, diverge, and join. The link data includes link IDs, link lengths, link directions, node coordinates (latitude/longitude) of a start and an end of each link, road types, road widths, the number of lanes, and speed limits. The node data includes node IDs, node coordinates, node names, node types, connection link IDs of all links connected to the nodes, and connection angles between each link. The map information storage 8 may be a memory card carried in from outside the host vehicle or a storage that stores map information downloaded from a server. The information is used not only as an uncountable noun but as a countable noun. The information is equivalent to an information item, and a plurality of informations are equivalent to a plurality of information items.

The communicator 9 performs wireless communication with the communicators 9 mounted to the different vehicles (vehicles B1 to B3) around the host vehicle (vehicle A) via an antenna (namely, inter-vehicle communication). The inter-vehicle communication may use a wave of 700 MHz bandwidth.

The HMI 10 is a manipulation input section such as a display apparatus and an audio output apparatus. The display apparatus displays texts and images based on instructions of the driving assist apparatus 2. The display apparatus may use a display or an indicator. The audio output apparatus includes a speaker to output speech based on instructions of the driving assist apparatus 2. The manipulation input section is a switch or a manipulation knob/handle manipulated by a user to perform various settings.

The vehicle control ECU 11 is an electrical control apparatus that controls acceleration and deceleration and steering of the host vehicle. The vehicle control ECU 11 includes a steering ECU that controls steering and an engine ECU and a brake ECU that control acceleration and deceleration.

The driving assist apparatus 2 contains an electronic control circuit (or also called an electronic control unit) that includes a CPU, a memory such as a ROM and RAM, an I/O, and a bus that connects these components as an example in the present embodiment to perform various processes by executing a control program in the ROM. The processes include vehicle information transmission processing that transmits vehicle information about a vehicle position of the host vehicle through inter-vehicle communication and encounter determination related processing that determines encounters between the host vehicle and each different vehicle by using the vehicle information transmitted through the inter-vehicle communication. Some or all of the functions executed by the driving assist apparatus 2 may be hardwired by one or more ICs.

<Schematic Configuration of Driving Assist Apparatus 2>

Figure 3:
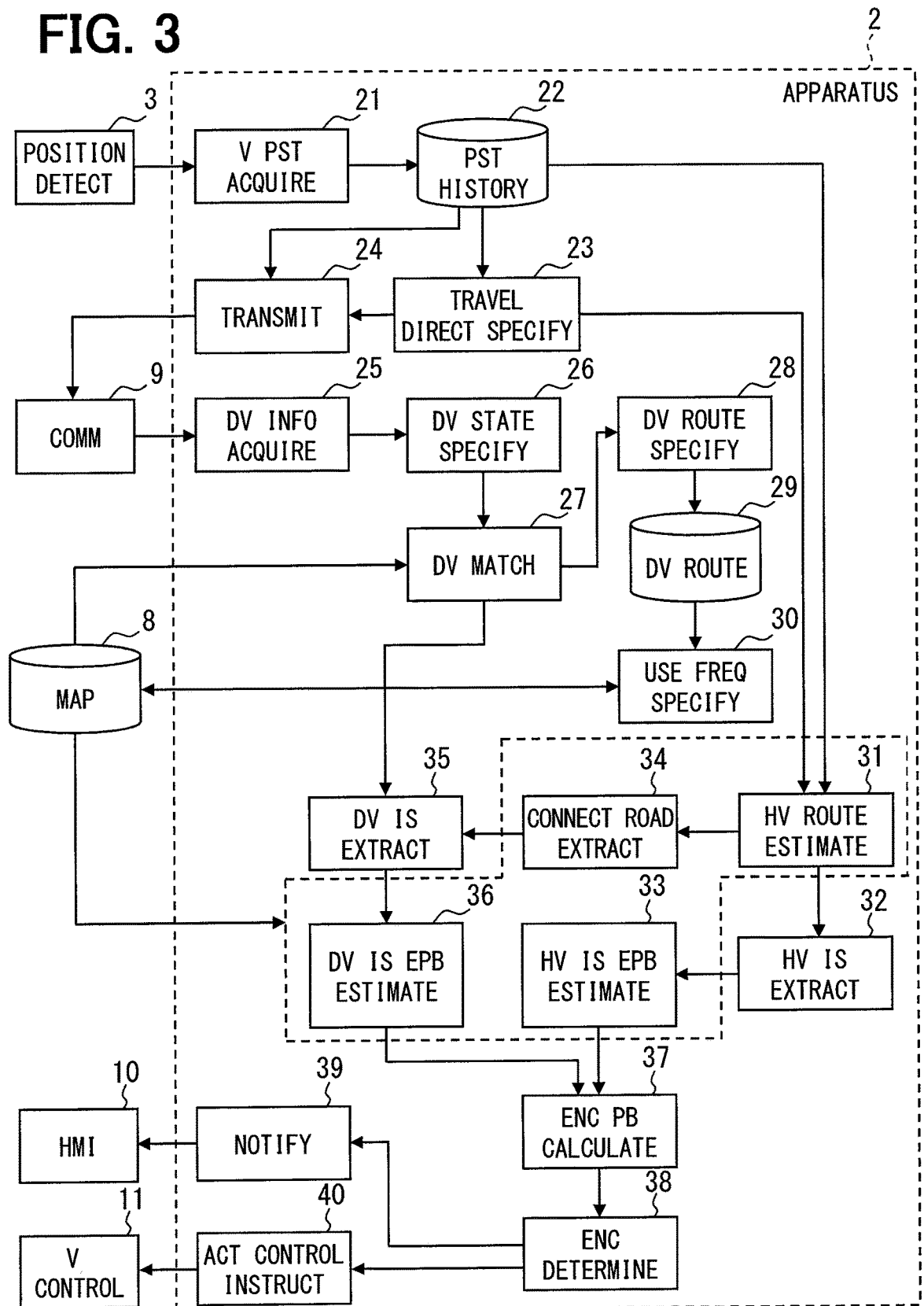
FIG. 3 is a block diagram illustrating an example of a schematic configuration of a driving assist apparatus.

As in FIG. 3, the driving assist apparatus 2 (namely, the electronic control circuit) includes a vehicle position acquisition section 21 (which may be also referred to as a vehicle position acquirer), a position history storage 22, a travel direction specification section 23 (which may be also referred to as a travel direction specifier), a transmission processing section 24 (which may be also referred to as a transmission processor), a different-vehicle information acquisition section 25 (which may be also referred to as a different-vehicle information acquirer), a different-vehicle state specification section 26 (which may be also referred to as a different-vehicle state specifier), a different-vehicle map matching section 27 (which may be also referred to as a different-vehicle map matching processor), a different-vehicle route specification section 28 (which may be also referred to as a different-vehicle route specifier), a different-vehicle route storage 29, a use frequency specification section 30 (which may be also referred to as a use frequency specifier), a host-vehicle course estimation section 31 (which may be also referred to as a host-vehicle course estimator), a host-vehicle intersection extraction section 32 (which may be also referred to as a host-vehicle intersection extractor), a host-vehicle intersection entering probability estimation section 33 (which may be also referred to as a host-vehicle intersection entering probability estimator), a connection road extraction section 34 (which may be also referred to as a connection road extractor), a different-vehicle intersection extraction section 35 (which may be also referred to as a different-vehicle intersection extractor), a different-vehicle intersection entering probability estimation section 36 (which may be also referred to as a different-vehicle intersection entering probability estimator), an encounter probability calculation section 37 (which may be also referred to as an encounter probability calculator), an encounter determination section 38 (which may be also referred to as an encounter determiner), a notification processing section 39 (which may be also referred to as a notification processor), and an action control instruction section 40 (which may be also referred to as an action control instructor). As indicated in the previous paragraph, each of the above sections included in the driving assist apparatus 2 may be hardwired by one or more ICs.

The vehicle position acquisition section 21 sequentially acquires current vehicle positions of the host vehicle detected by the position detector 3, and stores the positions in the position history storage 22. The position history storage 22 stores time-series data of the vehicle positions of the host vehicle sequentially acquired by the vehicle position acquisition section 21. The travel direction specification section 23 specifies a travel direction of the host vehicle based on the time-series data of the vehicle positions of the host vehicle in the position history storage 22. As an example, the travel direction of the host vehicle may be specified from an extension direction of an approximate line obtained from a plurality of time-series vehicle positions through a least squares technique.

In the above, the travel direction of the host vehicle is specified based on time-series vehicle positions of the host vehicle sequentially acquired by the vehicle position acquisition section 21. This is not however limiting. The travel direction of the host vehicle may be specified by a well-known technique based on detection results by the gyroscopic sensor 5 or acceleration sensor 7.

The transmission processing section 24 makes the communicator 9 transmit vehicle information including the vehicle position of the host vehicle acquired by the vehicle position acquisition section 21. As an example in the present embodiment, the time-series data of the vehicle positions including the latest vehicle position of the host vehicle acquired by the vehicle position acquisition section 21 is read from the position history storage 22, and the communicator 9 transmits the time-series data. Some or all of the time-series data of the vehicle positions may be read from the position history storage 22. The transmission processing section 24 may transmit the travel direction of the host vehicle specified by the travel direction specification section 23 and the speed of the host vehicle specified from the pulse signal of the wheel speed sensor 6 as the vehicle information.

The different-vehicle information acquisition section 25 sequentially acquires, via the communicator 9 of the host vehicle, the above vehicle information sequentially transmitted from each of the communicators 9 of the driving assist units 1 in the different vehicles. The vehicle information acquired from each of the different vehicles is also called different-vehicle information.

The different-vehicle state specification section 26 sequentially specifies a vehicle position and travel direction of each different vehicle from the vehicle information about each of the different vehicles sequentially acquired by the different-vehicle information acquisition section 25. As an example, the different-vehicle state specification section 26 may specify the latest vehicle position of the different vehicle in the vehicle information as the vehicle position of the different vehicle. The different-vehicle state specification section 26 may specify the travel direction of the different vehicle based on the time series-data of the vehicle positions of the different vehicle each included in the vehicle information through the least squares technique as above. When receiving the travel direction of the different vehicle from the different vehicle as the vehicle information, the different-vehicle state specification section 26 may specify the transmitted travel direction as the travel direction of the different vehicle.

The different-vehicle map matching section 27 sequentially specifies the vehicle position of the different vehicle on the map from the vehicle position and travel direction of the different vehicle sequentially specified by the different-vehicle state specification section 26 and from the map information in the map information storage 8 through the known map matching. The vehicle position of the different vehicle on the map herein is a position on a road on the map, namely, on a link.

The different-vehicle route specification section 28 specifies a route of the different vehicle on the map from the vehicle positions of the different vehicle sequentially specified by the different-vehicle map matching section 27, and stores the specified route in the different-vehicle route storage 29. The different-vehicle route storage 29 is an electrically-rewritable non-volatile memory. When acquiring the vehicle information from each of the plurality of different vehicles, the different-vehicle route specification section 28 specifies a route of each of the different vehicles from the vehicle positions of the different vehicles sequentially specified by the different-vehicle map matching section 27, and stores the specified routes in the different-vehicle route storage 29.

A technique of identifying the route of each different vehicle may use identification information such as an ID that specifies a vehicle as a transmission source when the vehicle information includes the identification information. When the vehicle information includes no identification information, the identification may use correlations of travel traces obtained from the time-series data of the vehicle positions.

The use frequency specification section 30 specifies a use frequency of each exit route from an intersection for each entry route based on the routes of the different vehicles in the different-vehicle route storage 29 and the map information in the map information storage 8. The use frequency may be the number of travels or a use rate of each exit route of an intersection for a certain entry route. The use frequency specified by the use frequency specification section 30 may be assigned to the node data in the map information storage 8. Additionally, an electrically-rewritable non-volatile memory of the driving assist apparatus 2 may store the information that associates each entry route of the subject intersection and the use frequency of each exit route of the subject intersection. The use frequency may be sequentially specified and updated by the use frequency specification section 30 each time a new route is stored in the different-vehicle route storage 29.

The host-vehicle course estimation section 31 sequentially specifies a vehicle position of the host vehicle on the map through the known map matching technique from the time-series data of the vehicle position of the host vehicle stored in the position history storage 22, the travel direction of the host vehicle sequentially specified by the travel direction specification section 23, and the map information stored in the map information storage 8. The host-vehicle course on the map is then estimated.

The host-vehicle course herein is the route when the host vehicle follows the road where the host vehicle is located. When a road branches ahead of the host vehicle, the branch road of the same road type as the road where the host vehicle is located is determined as a road to be followed. When the branch roads have the same road type, the branch road having a connection link angle closer to 180 degrees relative to the road where the host vehicle is located may be determined as a road to be followed. Alternatively, the branch road having a closer road width and a closer number of lanes to those of the road where the host vehicle is located may be determined as a road to be followed.

The host-vehicle intersection extraction section 32 extracts intersections from the host-vehicle course estimated by the host-vehicle course estimation section 31. The intersections extracted by the host-vehicle intersection extraction section 32 are called host-vehicle intersections.

The host-vehicle intersection entering probability estimation section 33 estimates probabilities of the host vehicle entering the host-vehicle intersections extracted by the host-vehicle intersection extraction section 32 based on the use frequency of each exit route of an intersection for each entry route specified by the use frequency specification section 30. The use frequency of each exit route of an intersection for each entry route may be assigned to each node in the map information storage 8.

Figure 4:
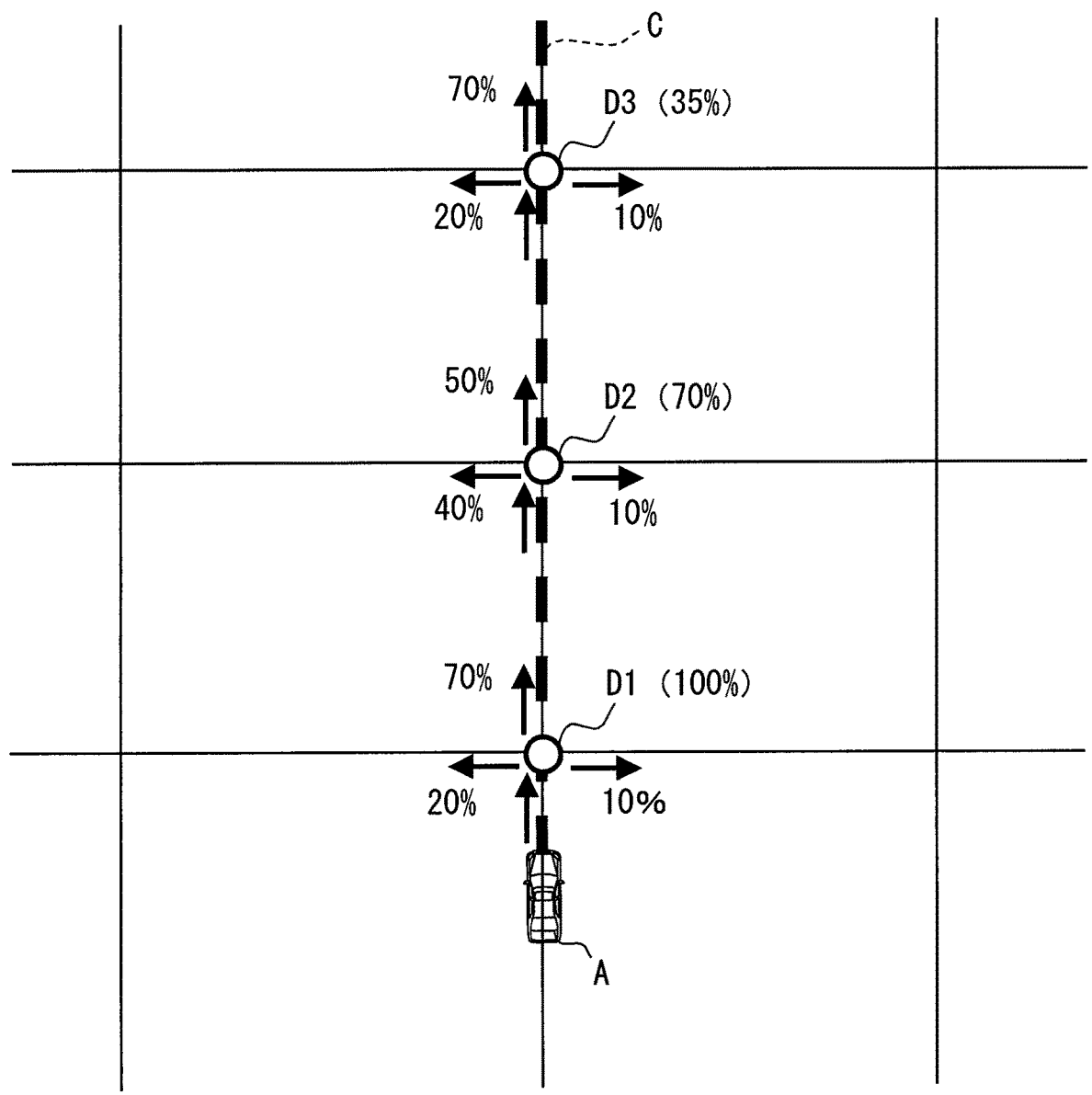
FIG. 4 is a schematic diagram to explain an example of a technique of estimating probabilities of a host vehicle entering host-vehicle intersections.

A procedure of estimating a probability of entering each host-vehicle intersection is explained using FIG. 4. FIG. 4 illustrates the host vehicle as A and the host-vehicle course as C. Seen from the vehicle position of the host vehicle on the host-vehicle course, the first host-vehicle intersection is indicated as D1, the second host-vehicle intersection is indicated as D2, and the third host-vehicle intersection is indicated as D3. In FIG. 4, the arrows toward the intersections indicate entry routes, and the arrows away from the intersections indicate exit routes. The numbers near the arrows of the exit routes indicate use probabilities of the exit routes. The numbers near the symbols of the host-vehicle intersections indicate probabilities of entering the host-vehicle intersections.

The probability of the host vehicle entering the first host-vehicle intersection D1 may be set to 100% as an example. The use probability of the exit route of the first host-vehicle intersection D1 connected to the second host-vehicle intersection D2 is obtained based on the use probability of each exit route of the first host-vehicle intersection D1 when the host vehicle enters the first host-vehicle intersection D1 from the road where the host vehicle is located. The obtained use probability of this exit route is estimated to be the probability of the host vehicle entering the host vehicle intersection D2. For the third intersection or further, a product of use probabilities of the exit routes sequentially connecting from the road where the host vehicle is located to the subject host-vehicle intersection is estimated as the probability of the host vehicle entering the subject host-vehicle intersection. The use probabilities are obtained through the same procedure as the above. When the use probabilities of the exit routes toward the third host-vehicle intersection D3 are respectively 70% and 50%, the probability of the host vehicle entering the third host-vehicle intersection is estimated as 35% (70%×50%).

The connection road extraction section 34 extracts connection roads connecting to each host-vehicle intersection in a predetermined range based on the map information in the map information storage 8 and the host-vehicle intersections extracted by the host-vehicle intersection extraction section 32. The connection road herein includes not only a road directly connecting to each host-vehicle intersection but also a road indirectly connecting to each host-vehicle intersection. The predetermined range is optionally settable, and may be defined by a straight line or a total link length.

The different-vehicle intersection extraction section 35 extracts intersections (hereinafter, different-vehicle intersections) on the course traveled by a different vehicle; this different vehicle is matched either to the host-vehicle course estimated by the host-vehicle course estimation section 31 or to the connection road extracted by the connection-road extraction section 34, by the different-vehicle map matching section 27. This different vehicle travels this course from the different-vehicle matched location toward the host-vehicle course.

The different-vehicle intersection entering probability estimation section 36 as well as the host-vehicle intersection entering probability estimation section 33 estimates a probability of the different vehicle entering each different-vehicle intersection extracted by the different-vehicle intersection extraction section 35 based on the use frequency of each exit route for each entry route of each intersection. This use frequency is specified by the use-frequency specification section 30.

Figure 5:
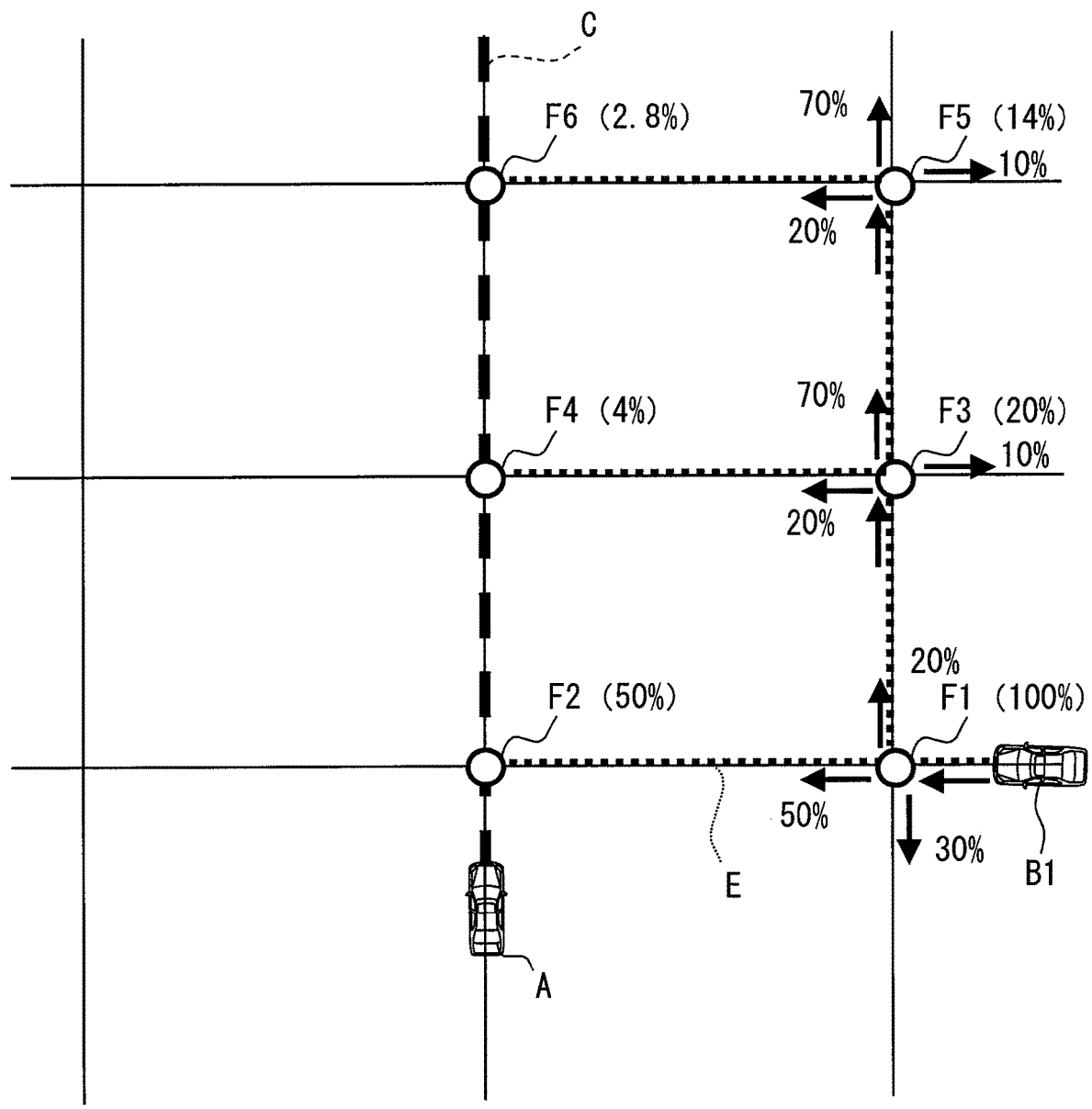
FIG. 5 is a schematic diagram to explain an example of a technique of estimating probabilities of a different vehicle entering different-vehicle intersections.

A procedure of estimating a probability of entering each different-vehicle intersection is explained using FIG. 5. FIG. 5 indicates the host vehicle as A, the different vehicle as B1, a host-vehicle course as C, and a course as E where the different vehicle B1 travels toward the host-vehicle course C. The different-vehicle intersections are indicated by F1 to F6. The different-vehicle intersection F2 is the same as the host-vehicle intersection D1. of FIG. 4. The different-vehicle intersection F4 is the same as the host-vehicle intersection D2 of FIG. 4. The different-vehicle intersection F6 is the same as the host-vehicle intersection D3 of FIG. 4. In FIG. 5, the arrows toward the intersections indicate entry routes, and the arrows away from the intersections indicate exit routes. The values near the arrows of the exit routes indicate use probabilities of the exit routes. The values near the symbols of the different-vehicle intersections indicate probabilities of entering the different-vehicle intersections.

In the example of FIG. 5, the course E for the different vehicle B1 to travel toward the host vehicle course C includes three routes. The first route (hereinafter, the first different-vehicle route) goes straight through the different-vehicle intersection F1 to reach the different-vehicle intersection F2 on the host-vehicle course C. The second route (hereinafter, the second different-vehicle route) turns left at the different-vehicle intersection F3 after turning right at the different-vehicle intersection F1 to reach the different-vehicle intersection F4 on the host-vehicle course C. The third route (hereinafter, the third different-vehicle route) goes straight through the different-vehicle intersection F3 after turning right at the different-vehicle intersection F1, turns left at the different-vehicle intersection F5, and reaches the different-vehicle intersection F6 on the host-vehicle course C.

The procedure of estimating a probability of entering each different-vehicle intersection may be the same as the above procedure of estimating a probability of entering each host-vehicle intersection. That is, a product of the probabilities of entering the exit routes sequentially connecting to the subject different-vehicle intersection may be estimated as a probability of the different vehicle entering the subject different-vehicle intersection.

The probability of the different vehicle entering the different-vehicle intersection F1 proximate to the vehicle position of the different vehicle may be 100% as an example. For the second different-vehicle intersection F2 on the first different-vehicle route and the third different-vehicle intersection F3 on the second and third routes, based on a use frequency of each exit route from the different-vehicle intersection F1 when the entry route to the different-vehicle intersection F1 is on the road where the different vehicle is located, use probabilities of the exit routes from the different-vehicle intersection F1 to the different-vehicle intersection F2 and different-vehicle intersection F3 are obtained. The use probabilities of the exit routes are then estimated as probabilities of the different vehicle entering the different-vehicle intersection F2 and different-vehicle intersection F3. When the use probability of the exit route connecting from the different-vehicle intersection F1 to the different-vehicle intersection F2 is 50%, the probability of the different vehicle entering the different-vehicle intersection F2 is estimated as 50%.

For the third different-vehicle intersection or further, a product of probabilities of entering the exit routes sequentially connecting from the road where the different vehicle is located to the subject different-vehicle intersection is estimated as a probability of the host vehicle entering the subject different-vehicle intersection. These entering probabilities of entering the exit routes are obtained through the same procedure as the above. When the use probabilities of the exit routes connecting to the different-vehicle intersection F4 on the second different-vehicle route are 20% and 20% respectively, the probability of the host vehicle entering the different-vehicle intersection F4 is estimated as 4% (20%×20%). When the use probabilities of the exit routes connecting to the different-vehicle intersection F5 on the third different-vehicle route are 20% and 70% respectively, the probability of the host vehicle entering the different-vehicle intersection F5 is estimated as 14% (20%×70%). When the use probabilities of the exit routes connecting to the different-vehicle intersection F6 on the third different-vehicle route are 20%, 70%, and 20% respectively, the probability of the host vehicle entering the different-vehicle intersection F6 is estimated as 2.8% (20%×70%×20%).

For the different vehicle which the different-vehicle map matching section 27 matches to the host-vehicle course estimated by the host-vehicle course estimation section 31, the different-vehicle intersections may be extracted as those on the course where the different vehicle travels along the host-vehicle course.

The encounter probability calculation section 37 calculates a probability of an encounter between the host vehicle and different vehicle at each host-vehicle intersection from the probability of the host vehicle entering each host-vehicle intersection and the probability of the different vehicle entering each different-vehicle intersection. The entering probability of the host vehicle is estimated by the host-vehicle intersection entering probability estimation section 33. The entering probability of the different vehicle is estimated by the different-vehicle intersection entering probability estimation section 36. By multiplying the probabilities of the host vehicle and different vehicle entering the same intersection, the probability of the encounter between the host vehicle and different vehicle at each host-vehicle intersection may be calculated. In the examples of FIGS. 4 and 5, the probability of the encounter between the host vehicle and different vehicle at the host-vehicle intersection D1 may be calculated as 50% by multiplying the probability of 100% of the host vehicle entering the host-vehicle intersection D1 and the probability of 50% of the different vehicle entering the different-vehicle intersection F2.

The encounter determination section 38 determines, as the different vehicle that encounters the host vehicle, the different vehicle having the encounter probability calculated to be equal to or more than a threshold by the encounter probability calculation section 37. The threshold herein may be any settable value to indicate a high encounter probability.

When the encounter determination section 38 determines the different vehicle that encounters the host vehicle, the notification processing section 39 makes the display apparatus and audio output apparatus of the HMI 10 notify a driver of the host vehicle that this different vehicle is present. As an example of the notification, the display apparatus may display a text and an icon that indicate the presence of the different vehicle having a high probability of encountering the host vehicle. Additionally, the display apparatus may display a position and direction of the different vehicle having a high probability of encountering the host vehicle. The position and direction of the different vehicle is relative to the host vehicle. The audio output apparatus may output an audio indicating the presence of the different vehicle having a high probability of encountering the host vehicle and a position and a direction of this different vehicle relative to the host vehicle.

When the encounter determination section 38 determines the different vehicle that encounters the host vehicle, the action control instruction section 40 automatically controls actions of the host vehicle that is to encounter this different vehicle by providing instructions for the vehicle control ECU 11. As an example, the engine ECU and brake ECU of the vehicle control ECU 11 may be instructed to automatically decelerate the host vehicle.

<Vehicle Information Transmission Processing>

Vehicle information transmission processing in the driving assist apparatus 2 is explained. The vehicle information transmission processing may start when the ignition power source of the host vehicle is turned on and end when the ignition power source is turned off.

In the vehicle information transmission processing, the transmission processing section 24 makes the communicator 9 transmit the time-series data of vehicle positions including the latest vehicle position of the host vehicle acquired by the vehicle position acquisition section 21 in each constant period such as each 100 msec.

When the different vehicle mounting the driving assist apparatus 2 is present within inter-vehicle communication, the driving assist apparatus 2 acquires, via the communicator 9, vehicle information transmitted through the vehicle information transmission processing in the driving assist apparatus 2 mounted to this different vehicle. When FIG. 1 indicates the host vehicle as A and the different vehicles within the inter-vehicle communication of the host vehicle as B1 to B3, the driving assist apparatus 2 of the vehicle A acquires, via the communicator 9, the vehicle information about each of the vehicles B1 to B3 transmitted through the vehicle information transmission processing in each of the driving assist apparatuses 2 of the vehicles B1 to B3.

<Encounter Determination Related Processing>

Figure 6:
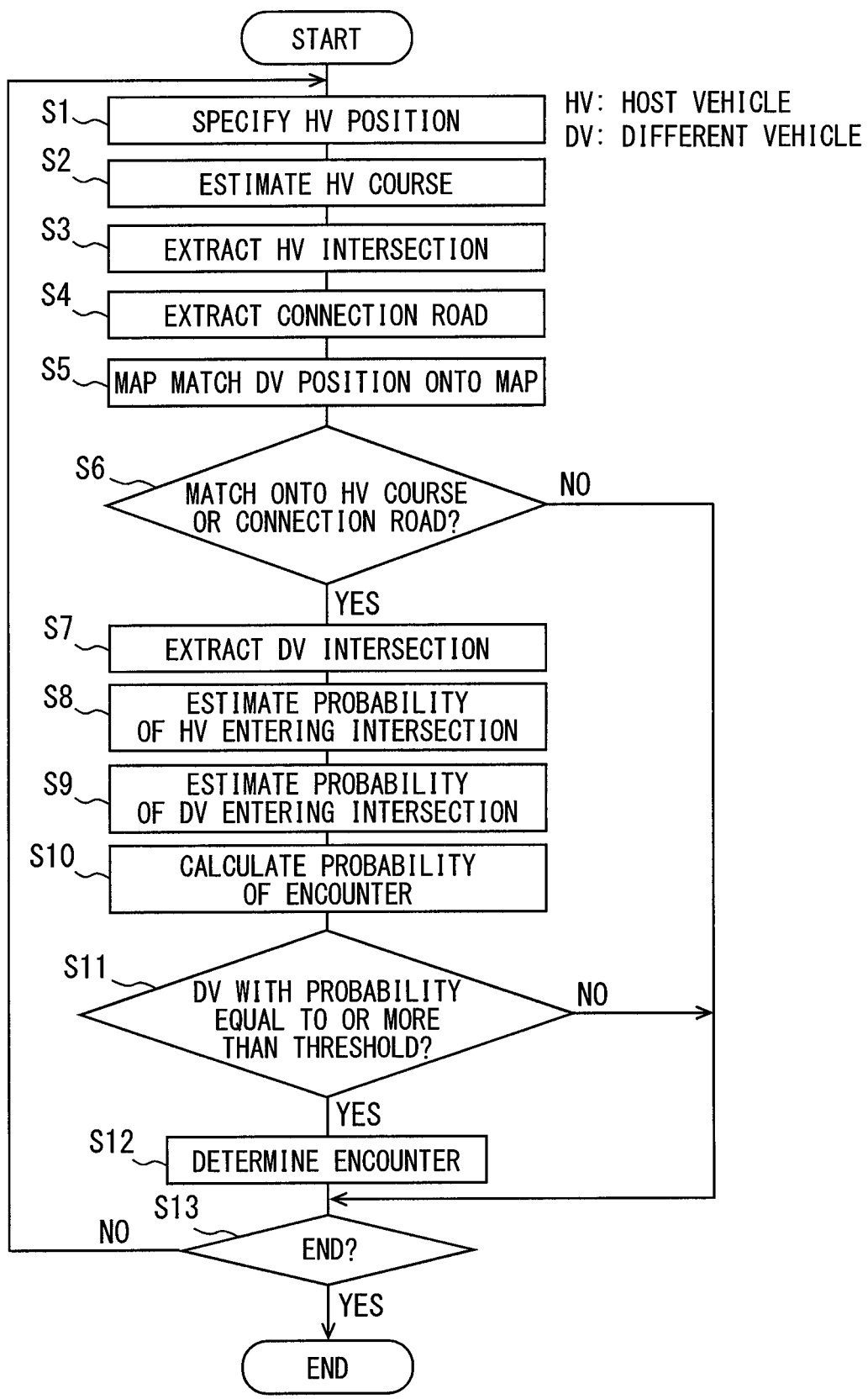
FIG. 6 is a flowchart illustrating an example flow of encounter determination related processing in the driving assist apparatus.

A flow of encounter determination related processing in the driving assist apparatus 2 is explained as an example using the flowchart of FIG. 6.

The encounter determination related processing may start when the ignition power supply of the host vehicle is turned on. Here, the processing is explained below on the assumption that the routes of the plurality of different vehicles are sufficiently stored in the different-vehicle route storage 29 for the use-frequency specification section 30 to determine the use frequencies and that the use frequencies specified by the use-frequency specification section 30 are already assigned to the node data in the map information storage 8.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or a specific name. For instance, a calculation section may be also referred to as a calculation device, a calculation module, or a calculator. As explained above, each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

At S1, the host-vehicle course estimation section 31 specifies a vehicle position of the host vehicle on the map through the map matching from time-series data of the vehicle position of the host vehicle in the position history storage 22, the travel direction of the host vehicle sequentially specified by the travel direction specification section 23, and the map information in the map information storage 8. At S2, the host-vehicle course estimation section 31 estimates a host-vehicle course on the map based on the vehicle position of the host vehicle on the map specified at S1 and the map information in the map information storage 8. At S3, the host-vehicle intersection extraction section 32 extracts host-vehicle intersections from the host vehicle course estimated at S2.

At S4, the connection road extraction section 34 extracts connection roads connected to each host-vehicle intersection within a predetermined range based on the host-vehicle intersections extracted at S3 and the map information in the map information storage 8. At S5, the different-vehicle map matching section 27 specifies vehicle positions of the different vehicles on the map through the map matching from the vehicle positions and travel directions of the different vehicles specified by the different-vehicle state specification section 26 and the map information in the map information storage 8.

At S6, the processing moves to S7 when, at S5, the vehicle position of the different vehicle is matched to either the host-vehicle course estimated at S2 or the connection road extracted at S4 (YES at S6). In contrast, when, at S5, the vehicle positions of the different vehicles are not matched to the host-vehicle course estimated at S2 or the connection roads extracted at S4 (NO at S6), the processing moves to S13.

For the different vehicle matched either to the host-vehicle course estimated at S2 or to the connection road extracted at S4, the different-vehicle intersection extraction section 35 extracts different-vehicle intersections on the course from the different-vehicle matched location to the host-vehicle course at S7.

At S8, the host-vehicle intersection entering probability estimation section 33 estimates probabilities of the host vehicle entering the host-vehicle intersections extracted at S3 based on the use frequency of each exit route for each entry route of each intersection specified by the use frequency specification section 30. At S9, the different-vehicle intersection entering probability estimation section 36 estimates probabilities of the different vehicle entering the different-vehicle intersections extracted at S7 based on the use frequency of each exit route for each entry route of each intersection specified by the use-frequency specification section 30.

At S10, the encounter probability calculation section 37 calculates a probability of an encounter between the host vehicle and each different vehicle at each host-vehicle intersection from the probabilities of the host vehicle entering the host-vehicle intersections estimated at S8 and the probabilities of each different vehicle entering the different-vehicle intersections estimated at S9. At S11, when the different vehicle having the encounter probability calculated at S10 to be equal to or more than the threshold (YES at S11) is present, the processing moves to S12. When there are no different vehicle having the encounter probability calculated at S10 to be equal to or more than the threshold (NO at S11), the processing moves to S13.

At S12, the encounter determination section 38 determines, as the different vehicle that encounters the host vehicle, the different vehicle having the encounter probability calculated at S10 to be equal to or more than the threshold. At S13, when it is time to end the encounter determination related processing (YES at S13), the encounter determination related processing is ended. In contrast, when it is not time to end the encounter determination related processing (NO at S13), the processing returns to S1 and repeats. The time to end the encounter determination related processing includes turning-off of the ignition power supply of the host vehicle.

When the different vehicle that encounters the host vehicle is determined, the notification processing section 39 makes the display apparatus and audio output apparatus of the HMI 10 notify the driver of the host vehicle that this different vehicle is present as above. Additionally, the action control instruction section 40 may instruct the vehicle control ECU 11 to automatically control actions of the host vehicle in response to the encounter with that different vehicle.

<Summary of First Embodiment>

In the first embodiment, the different vehicle having the probability of encountering the host vehicle calculated to be equal to or more than the threshold is determined as the different vehicle that encounters the host vehicle. This encountering probability is calculated by multiplying the probabilities of the host vehicle and different vehicle entering the same intersection. Therefore, the different vehicle whose probability of encountering the host vehicle is equal to or more than the threshold at the host-vehicle intersection and which is thus more likely to encounter the host vehicle can be determined accurately.

In the first embodiment, the probabilities of the host vehicle entering the host-vehicle intersections and the probabilities of each different vehicle entering the different-vehicle intersections are estimated based on the use frequency of each exit route for each entry route of each intersection specified using the routes of the different vehicles. The use probability of each exit route from the intersection for each entry route specified using the routes of the different vehicles properly indicates a tendency of courses selected by the vehicles. This enables accurate estimations of the probabilities of the host vehicle entering the host-vehicle intersections and the probabilities of each different vehicle entering the different-vehicle intersections. This increases the accuracy of the encounter probability between the host vehicle and each different vehicle calculated by multiplying the probabilities of the host vehicle and each different vehicle entering the same intersection. The different vehicle that is more likely to encounter the host vehicle can be thus determined accurately.

(First Modification)

The encounter determination section 38 may further refine the different vehicles whose encounter probabilities are calculated by the encounter probability calculation section 37 to be equal to or more than the threshold under the following conditions to determine the different vehicle that encounters the host vehicle. Specifically, from travel speeds of the host vehicle and different vehicles and routes to the subject intersection, times for the host vehicle and different vehicles to reach the subject intersection are respectively calculated. Then, the different vehicles having tolerable arrival time differences relative to the arrival time of the host vehicle may be further refined to determine the different vehicle that encounters the host vehicle. The travel speeds of the host vehicle and different vehicles may be specified from an amount of change in each vehicle position per time or by acquiring vehicle speed information.

The above configuration is capable of accurately determining the different vehicle having a higher probability of encountering the host vehicle. Additionally, after the refinement to the different vehicle having the encounter probability calculated by the encounter probability calculation section 37 to be equal to or more than the threshold, a time for the different vehicle to reach the subject intersection is calculated. This achieves reduction in processing load and improvement in processing speed.

(Second Modification)

The first embodiment describes that the host-vehicle intersection entering probability estimation section 33 and different-vehicle intersection entering probability estimation section 36 estimate probabilities of entering the host-vehicle intersections and different-vehicle intersections based on the use frequency of each exit route from the intersection for each entry route specified by the use-frequency specification section 30 by using the routes of the different vehicles. This is however not limiting. Probabilities of entering the host-vehicle intersections and different-vehicle intersections may be estimated based on the link data of the map information (hereinafter, a second modification).

The second modification is explained below using the drawings. For convenience of explanation, components having the same functions as the components in the above drawings are given the same reference numerals and not explained in the second modification or later. The driving assist unit 1 of the second modification is the same as the driving assist unit 1 of the first embodiment except for including a driving assist apparatus 2a instead of the driving assist apparatus 2.

Figure 7:
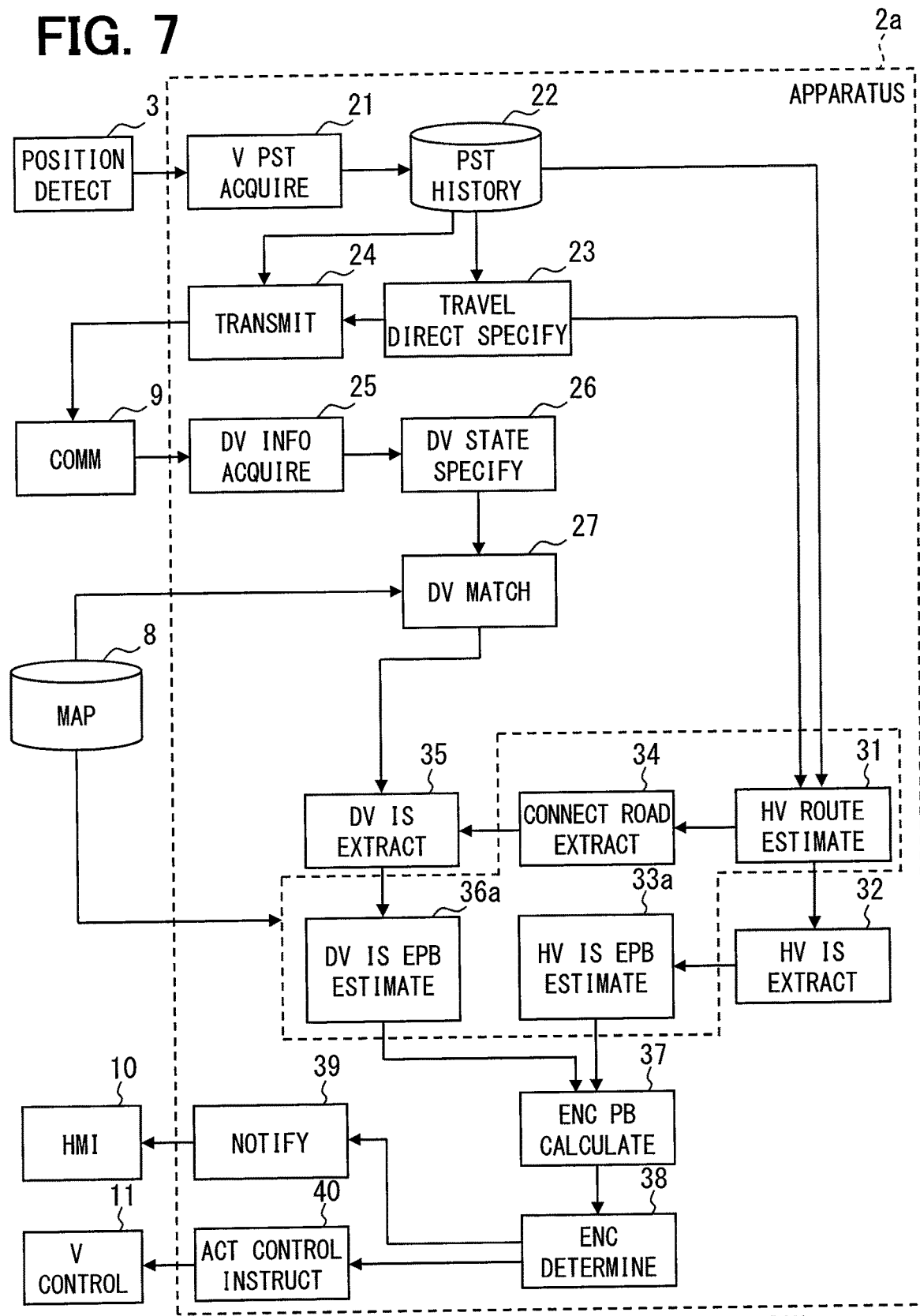
FIG. 7 is a block diagram illustrating an example of a schematic configuration of a driving assist apparatus of a second modification.

As in FIG. 7, the driving assist apparatus 2a includes the vehicle position acquisition section 21, the position history storage 22, the travel direction specification section 23, the transmission processing section 24, the different-vehicle information acquisition section 25, the different-vehicle state specification section 26, the different-vehicle map matching section 27, the host-vehicle course estimation section 31, the host-vehicle intersection extraction section 32, a host-vehicle intersection entering probability estimation section 33a, the connection road extraction section 34, the different-vehicle intersection extraction section 35, a different-vehicle intersection entering probability estimation section 36a, the encounter probability calculation section 37, the encounter determination section 38, the notification processing section 39, and the action control instruction section 40. The driving assist apparatus 2a is the same as the driving assist apparatus 2 of the first embodiment except for not including the different-vehicle route specification section 28, different-vehicle route storage 29, and the use-frequency specification section 30 and for including the host-vehicle intersection entering probability estimation section 33a and different-vehicle intersection entering probability estimation section 36a instead of the host-vehicle intersection entering probability estimation section 33 and different-vehicle intersection entering probability estimation section 36.

The host-vehicle intersection entering probability estimation section 33a estimates probabilities of the host vehicle entering the host-vehicle intersections extracted by the host-vehicle intersection extraction section 32 based on the link data in the map information storage 8. As an example, based on the information about scales of the roads in the link data, a use probability of each exit route for entry route of each intersection is estimated lower on a road having a smaller scale. Then, a product of the probabilities of entering the exit routes sequentially connecting from the road where the host vehicle is located to the subject host-vehicle intersection may be estimated as a probability of the host vehicle entering the subject host-vehicle intersection.

The information about scales of the roads include a road type, a road width, and the number of lanes. The road type information may indicate a major road as a larger scaled road. The road width information may indicate a wider road as a larger scaled road. The information about the number of lanes may indicate a road having the greater number of lanes as a larger scaled road. Additionally, a road having a higher limited speed may be treated as a larger scaled road.

The different-vehicle intersection entering probability estimation section 36a as well as the host-vehicle intersection entering probability estimation section 33a estimates a probability of each different vehicle entering the different-vehicle intersections extracted by the different-vehicle intersection extraction section 35 based on the link data in the map information storage 8.

The second modification is also capable of accurately determining the different vehicle having a higher probability of encountering the host vehicle. The detail is as follows. A larger scaled road may be likely to be used. Probabilities of entering the intersections can be therefore accurately estimated by using the information indicating scales of roads. This enables a probability of an encounter between the host vehicle and each different vehicle to be accurately calculated. Thus, the different vehicle having a higher possibility of encountering the host vehicle can be accurately determined.

The second modification and the first embodiment may be combined. In this case, a product of the probability entering each intersection estimated based on the use frequency of each exit route of each intersection specified by the use-frequency specification section 30 and a larger coefficient on a larger scale road may be estimated as a probability of entering each intersection.

(Third Modification)

In addition to the second modification, probabilities of entering the host-vehicle intersections and different-vehicle intersections are estimated based on traffic information (hereinafter, a third modification). The third modification is explained below using the drawings. The driving assist unit 1 of the third modification is the same as the driving assist unit 1 of the first embodiment except for some functions of the communicator 9 and except for including a driving assist apparatus 2b instead of the driving assist apparatus 2.

The communicator 9 of the third modification is the same as the communicator 9 of the first embodiment except for receiving traffic information delivered from a center that delivers the traffic information. A unit of performing inter-vehicle communication and a unit of receiving traffic information may be provided integrally or separately. The traffic information includes congestion information and closed-road information.

The communicator 9 can receive the traffic information by using an in-vehicle communication module used for telematics communication, such as a DCM (data communication module) and a small in-vehicle communicator that receives the traffic information transmitted from electric wave beacons and optical beacons installed on roads.

Figure 8:
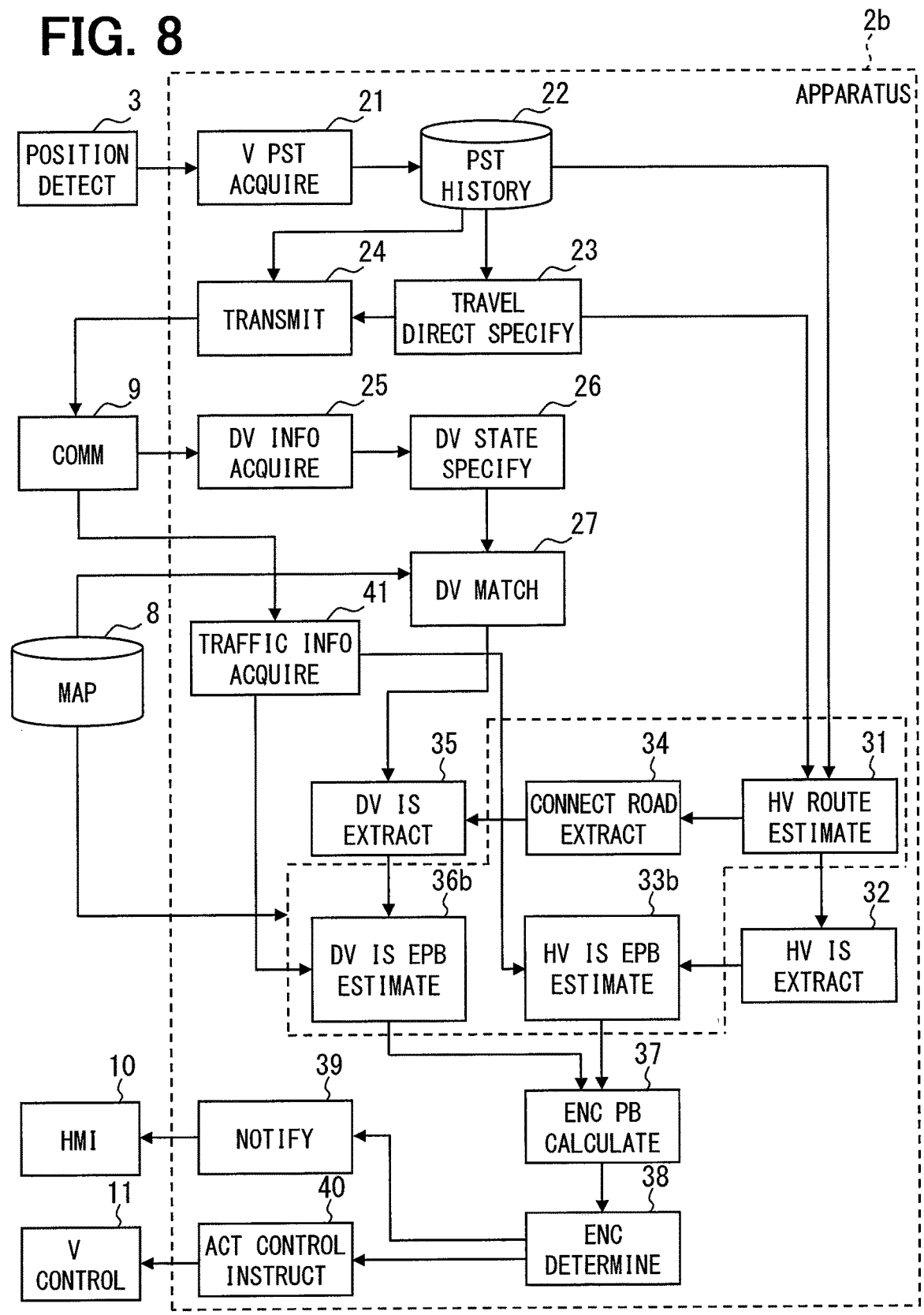
FIG. 8 is a block diagram illustrating an example of a schematic configuration of a driving assist apparatus of a third modification.

As in FIG. 8, the driving assist apparatus 2b includes the vehicle position acquisition section 21, the position history storage 22, the travel direction specification section 23, the transmission processing section 24, the different-vehicle information acquisition section 25, the different-vehicle state specification section 26, the different-vehicle map matching section 27, the host-vehicle course estimation section 31, the host-vehicle intersection extraction section 32, a host-vehicle intersection entering probability estimation section 33b, the connection road extraction section 34, the different-vehicle intersection extraction section 35, a different-vehicle intersection entering probability estimation section 36b, the encounter probability calculation section 37, the encounter determination section 38, the notification processing section 39, the action control instruction section 40, and a traffic information acquisition section 41 (which may be also referred to as a traffic information acquirer). The driving assist apparatus 2b is the same as the driving assist apparatus 2 of the first embodiment except for not including the different-vehicle route specification section 28, different-vehicle route storage 29, and use-frequency specification section 30, except for including the traffic information acquisition section 41, and except for including the host-vehicle intersection entering probability estimation section 33b and different-vehicle intersection entering probability estimation section 36b instead of the host-vehicle intersection entering probability estimation section 33 and different-vehicle intersection entering probability estimation section 36.

The traffic information acquisition section 41 acquires traffic information distributed from the center that distributes the traffic information via the communicator 9.

The host-vehicle intersection entering probability estimation section 33b estimates probabilities of the host vehicle entering the host-vehicle intersections extracted by the host-vehicle intersection extraction section 32 based on the traffic information acquired by the traffic information acquisition section 41 and the link data in the map information storage 8. As an example, a use probability of each exit route for each entry route of each intersection is estimated lower on a greatly congested road and a closed road based on the congestion information and closed-road information of the traffic information. A product of probabilities of entering the exit routes sequentially connecting from the road where the host vehicle is located to the subject host-vehicle intersection may be estimated as a probability of the host vehicle entering the subject host-vehicle intersection.

The different-vehicle intersection entering probability estimation section 36b as well as the host-vehicle intersection entering probability estimation section 33b estimates probabilities of each different vehicle entering the different-vehicle intersections extracted by the different-vehicle intersection extraction section 35 based on traffic information such as congestion information and closed-road information acquired by the traffic information acquisition section 41 and link data in the map information storage 8.

Even the third modification is capable of accurately determining the different vehicle having a higher probability of encountering the host vehicle. The detail is as follows. Greatly congested roads and closed roads may be less likely to be used. Therefore, probabilities of entering the intersections can be accurately estimated using traffic information such as congestion information and closed-road information, and thus a probability of the encounter between the host vehicle and each different vehicle can be accurately calculated. Consequently, the different vehicle having a higher probability of encountering the host vehicle can be accurately determined.

The third modification may be combined with the first embodiment or the second modification. In this case, a product of a probability of entering each intersection estimated as in the first embodiment and the second modification and a coefficient that is smaller on a greatly congested road and a closed road may be estimated as a probability of entering each intersection.

(Fourth Modification)

The first embodiment describes that the host-vehicle course estimation section 31 estimates, as a host-vehicle course, a route the host vehicle follows from the road where the host vehicle is located, but this is not limiting. When a recommended route for the host vehicle can be acquired from an apparatus having a navigation function used in the host vehicle, the host-vehicle course estimation section 31 may estimate this recommended route as a host-vehicle course. In this case, the host-vehicle intersection entering probability estimation sections 33, 33a, and 33b may estimate a probability of the host vehicle entering each host-vehicle intersection as 100% or as a predetermined constant value of a high probability other than 100%.

(Fifth Modification)

The driving assist apparatus 2 includes the notification processing section 39 and action control instruction section 40 in the first embodiment, but this is not limiting. The driving assist apparatus 2 may include only any one of these sections.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

What is claimed is:

1. An encounter vehicle determination apparatus mounted in each of a plurality of vehicles along with an in-vehicle communicator performing a wireless inter-vehicle communication, the plurality of vehicles including a host vehicle and a different vehicle around the host vehicle, the encounter vehicle determination apparatus comprising:

a different-vehicle information acquisition section that acquires different-vehicle information transmitted by the wireless inter-vehicle communication from the different vehicle to specify a position and a travel direction of the different vehicle;

a different-vehicle state specification section that specifies the position and the travel direction of the different vehicle based on the different-vehicle information acquired by the different-vehicle information acquisition section;

a host-vehicle course estimation section that estimates a host-vehicle course on a map;

a host-vehicle intersection extraction section that extracts host-vehicle intersections that are intersections on the host-vehicle course estimated by the host-vehicle course estimation section;

a connection road extraction section that extracts connection roads in a predetermined range, the connection roads being roads connecting to the host-vehicle intersections extracted by the host-vehicle intersection extraction section;

a different-vehicle map matching section that performs map matching to match the position of the different vehicle to a location on a road of the map based on the position and the travel direction of the different vehicle specified by the different-vehicle state specification section;

a different-vehicle intersection extraction section that extracts different-vehicle intersections that are intersections either
  (i) on a course along the host-vehicle course from the matched location of the different vehicle in response to the position of the different vehicle being matched to a location on the host-vehicle course estimated by the host-vehicle course estimation section, or
  (ii) on a course from the matched location of the different vehicle to the host-vehicle course in response to the position of the different vehicle being matched to a location on the connection road extracted by the connection road extraction section;

a host-vehicle intersection entering probability estimation section that estimates probabilities of the host vehicle entering the host-vehicle intersections extracted by the host-vehicle intersection extraction section;

a different-vehicle intersection entering probability estimation section that estimates probabilities of the different vehicle entering the different-vehicle intersections extracted by the different-vehicle intersection extraction section;

an encounter probability calculation section that calculates a probability of an encounter between the host vehicle and the different vehicle at each host-vehicle intersection from the probabilities of the host vehicle entering the host-vehicle intersections estimated by the host-vehicle intersection entering probability estimation section and the probabilities of the different vehicle entering the different-vehicle intersections estimated by the different-vehicle intersection entering probability estimation section; and an encounter determination section that determines that the different vehicle having the probability of the encounter calculated to be equal to or more than a threshold encounters the host vehicle.

2. The encounter vehicle determination apparatus according to claim 1, further comprising:
a different-vehicle route specification section that specifies routes of a plurality of the different vehicles present around the host vehicle based on the positions and travel directions of the plurality of the different vehicles that the different-vehicle state specification section specifies from the different-vehicle information acquired by the different-vehicle information acquisition section,
wherein the different-vehicle intersection entering probability estimation section estimates the probabilities of the different vehicles each entering the different-vehicle intersections extracted by the different-vehicle intersection extraction section based on the routes of the different vehicles specified by the different-vehicle route specification section.

3. The encounter vehicle determination apparatus according to claim 1, wherein the different-vehicle intersection entering probability estimation section estimates the probabilities of the different vehicle entering the different-vehicle intersections extracted by the different-vehicle intersection extraction section by using information indicating sizes of roads.

4. The encounter vehicle determination apparatus according to claim 1, further comprising:
a traffic information acquisition section that acquires traffic information about roads,
wherein the different-vehicle intersection entering probability estimation section estimates the probabilities of the different vehicle entering the different-vehicle intersections extracted by the different-vehicle intersection extraction section by using the traffic information acquired by the traffic information acquisition section.

5. An encounter vehicle determination apparatus mounted in each of a plurality of vehicles along with an in-vehicle communicator performing a wireless inter-vehicle communication, the plurality of vehicles including a host vehicle and a different vehicle around the host vehicle, the encounter vehicle determination apparatus comprising:
at least one electronic control circuit configured to:
acquire different-vehicle information transmitted by the wireless inter-vehicle communication from the different vehicle to specify a position and a travel direction of the different vehicle;
specify the position and the travel direction of the different vehicle based on the different-vehicle information;
estimate a host-vehicle course on a map;
extract host-vehicle intersections that are intersections on the host-vehicle course;
extract connection roads in a predetermined range, the connection roads being roads connecting to the host-vehicle intersections;
perform map matching to match the position of the different vehicle to a location on a road of the map based on the position and the travel direction of the different vehicle;
extract different-vehicle intersections that are intersections either
(i) on a course along the host-vehicle course from the matched location of the different vehicle in response to the position of the different vehicle being matched to a location on the host-vehicle course, or
(ii) on a course from the matched location of the different vehicle to the host-vehicle course in response to the position of the different vehicle being matched to a location on the connection road;
estimate probabilities of the host vehicle entering the host-vehicle intersections;
estimate probabilities of the different vehicle entering the different-vehicle intersections;
calculate a probability of an encounter between the host vehicle and the different vehicle at each host-vehicle intersection from the probabilities of the host vehicle entering the host-vehicle intersections and the probabilities of the different vehicle entering the different-vehicle intersections; and
determine that the different vehicle having the probability of the encounter calculated to be equal to or more than a threshold encounters the host vehicle.

6. The encounter vehicle determination apparatus according to claim 5, wherein
the at least one electronic control circuit is further configured
to specify routes of a plurality of the different vehicles present around the host vehicle based on the positions and travel directions of the plurality of the different vehicles specified from the different vehicle information, and
to estimate the probabilities of the different vehicles each entering the different vehicle intersections extracted based on the routes of the different vehicles.

7. The encounter vehicle determination apparatus according to claim 5, wherein
the at least one electronic control circuit is further configured
to estimate the probabilities of the different vehicle entering the different-vehicle intersections by using information indicating sizes of roads.

8. The encounter vehicle determination apparatus according to claim 5, wherein
the at least one electronic control circuit is further configured
to acquire traffic information about roads, and
to estimate the probabilities of the different vehicle entering the different-vehicle intersections by using the traffic information.

\* \* \* \* \*